US010091385B2

(12) United States Patent
Ueta

(10) Patent No.: US 10,091,385 B2
(45) Date of Patent: Oct. 2, 2018

(54) INFORMATION PROCESSING APPARATUS AND IMAGE FORMING APPARATUS

(71) Applicants:KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Tsutomu Ueta, Yaizu Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/466,065

(22) Filed: Mar. 22, 2017

(65) Prior Publication Data

US 2018/0241901 A1    Aug. 23, 2018

(30) Foreign Application Priority Data

Feb. 20, 2017   (JP) ................. 2017-029254

(51) Int. Cl.
*H04N 1/04*        (2006.01)
*H04N 1/21*        (2006.01)
*H04N 1/44*        (2006.01)

(52) U.S. Cl.
CPC ........... *H04N 1/217* (2013.01); *H04N 1/4433* (2013.01)

(58) Field of Classification Search
CPC .. H04N 21/21; H04N 21/23; H04N 21/26216; H04N 21/26616; H04N 21/4331; H04N 21/47202; H04N 7/17336; H04L 12/5601; H04L 2012/5625; H04L 2012/5628; H04L 2012/5636

USPC ............ 710/20, 6, 33, 21, 30; 348/E5.008, 348/E7.073; 370/236, 252; 38/1.15, 442
See application file for complete search history.

(56) References Cited

U.S. PATENT DOCUMENTS

| | | | | |
|---|---|---|---|---|
| 4,920,534 A * | 4/1990 | Adelmann | ............. | H04L 12/64 370/471 |
| 5,148,539 A * | 9/1992 | Enomoto | ............ | G06F 13/4018 710/307 |
| 5,315,643 A * | 5/1994 | Yoshida | ............. | H04N 1/32058 358/438 |
| 5,664,220 A * | 9/1997 | Itoh | ..................... | H04N 7/17336 348/E7.073 |
| 6,240,460 B1* | 5/2001 | Mitsutake | ............... | H04L 47/10 370/230 |
| 6,434,164 B1* | 8/2002 | Matsunaga | ............ | H04H 20/78 348/E7.07 |
| 6,636,325 B1* | 10/2003 | Kurase | ................... | G06K 15/00 358/1.14 |
| 6,678,330 B1* | 1/2004 | Kondo | ................... | H04N 5/145 348/E5.066 |

(Continued)

FOREIGN PATENT DOCUMENTS

JP       9-327959       12/1997
JP      2010-220125       9/2010

*Primary Examiner* — Negussie Worku
(74) *Attorney, Agent, or Firm* — Amin, Turocy & Watson LLP

(57) ABSTRACT

According to one embodiment, an information processing apparatus includes a data amount detection unit and a recording unit. The data amount detection unit detects a data amount of data which is related to image processing and is included in transmission information transmitted when performing image processing. The recording unit adds and records the detected data amount.

11 Claims, 6 Drawing Sheets

(56) References Cited

U.S. PATENT DOCUMENTS

| | | | | |
|---|---|---|---|---|
| 6,813,245 | B1 * | 11/2004 | Furuno | H04L 12/5601 370/236 |
| 8,429,733 | B2 * | 4/2013 | Kawano | G06F 21/34 455/406 |
| 8,854,500 | B2 * | 10/2014 | Ishida | H04N 5/23238 348/231.2 |
| 9,961,405 | B2 * | 5/2018 | Mallian | H04N 21/482 |
| 9,961,409 | B2 * | 5/2018 | Kitazato | H04N 21/4858 |
| 2002/0057448 | A1 * | 5/2002 | Ueda | G06F 13/4291 358/1.15 |
| 2002/0154331 | A1 * | 10/2002 | Yamauchi | H04N 1/0001 358/1.15 |
| 2006/0031678 | A1 * | 2/2006 | Yasuhara | H04L 9/3247 713/176 |
| 2006/0143330 | A1 * | 6/2006 | Kiehl | G06F 13/28 710/35 |
| 2007/0033319 | A1 * | 2/2007 | Yahagi | G06F 13/1673 711/5 |
| 2008/0109571 | A1 * | 5/2008 | Lee | G06F 13/28 710/22 |
| 2008/0222676 | A1 * | 9/2008 | Yun | H04H 20/426 725/38 |
| 2009/0063368 | A1 * | 3/2009 | Morishita | G06Q 30/04 705/400 |
| 2009/0125778 | A1 * | 5/2009 | Uchida | H04L 1/1685 714/749 |
| 2013/0100477 | A1 * | 4/2013 | Ozaki | G06F 3/1204 358/1.13 |
| 2015/0229967 | A1 * | 8/2015 | Lee | H04N 19/30 375/240.02 |
| 2015/0358969 | A1 * | 12/2015 | Choi | H04W 72/0453 370/329 |

* cited by examiner

INFORMATION PROCESSING APPARATUS AND IMAGE FORMING APPARATUS

CROSS-REFERENCE TO RELATED APPLICATION

This application is based upon and claims the benefit of priority from Japanese Patent Application No. 2017-029254, filed Feb. 20, 2017, the entire contents of which are incorporated herein by reference.

FIELD

An embodiment described herein relates generally to an information processing apparatus and an image forming apparatus.

BACKGROUND

In the related art, an image forming apparatus detects an amount of data to be subjected to image processing based on parameters of a job to be subjected to image processing. The detected data amount is recorded for each user of the image forming apparatus, and is used for, for example, use management of the image forming apparatus such as accounting management or user restriction according to the data amount.

Further, in data transmission related to image processing, there are cases where a CPU controls data transmission, and where data transmission is performed without control of the CPU. For example, in data transmission between image processing circuits, the image processing circuit directly transmits data without the control of the CPU.

However, in image processing, when data transmission is performed without the control of the CPU, the CPU cannot detect the data amount in image processing.

DETAILED DESCRIPTION

Figure 1:
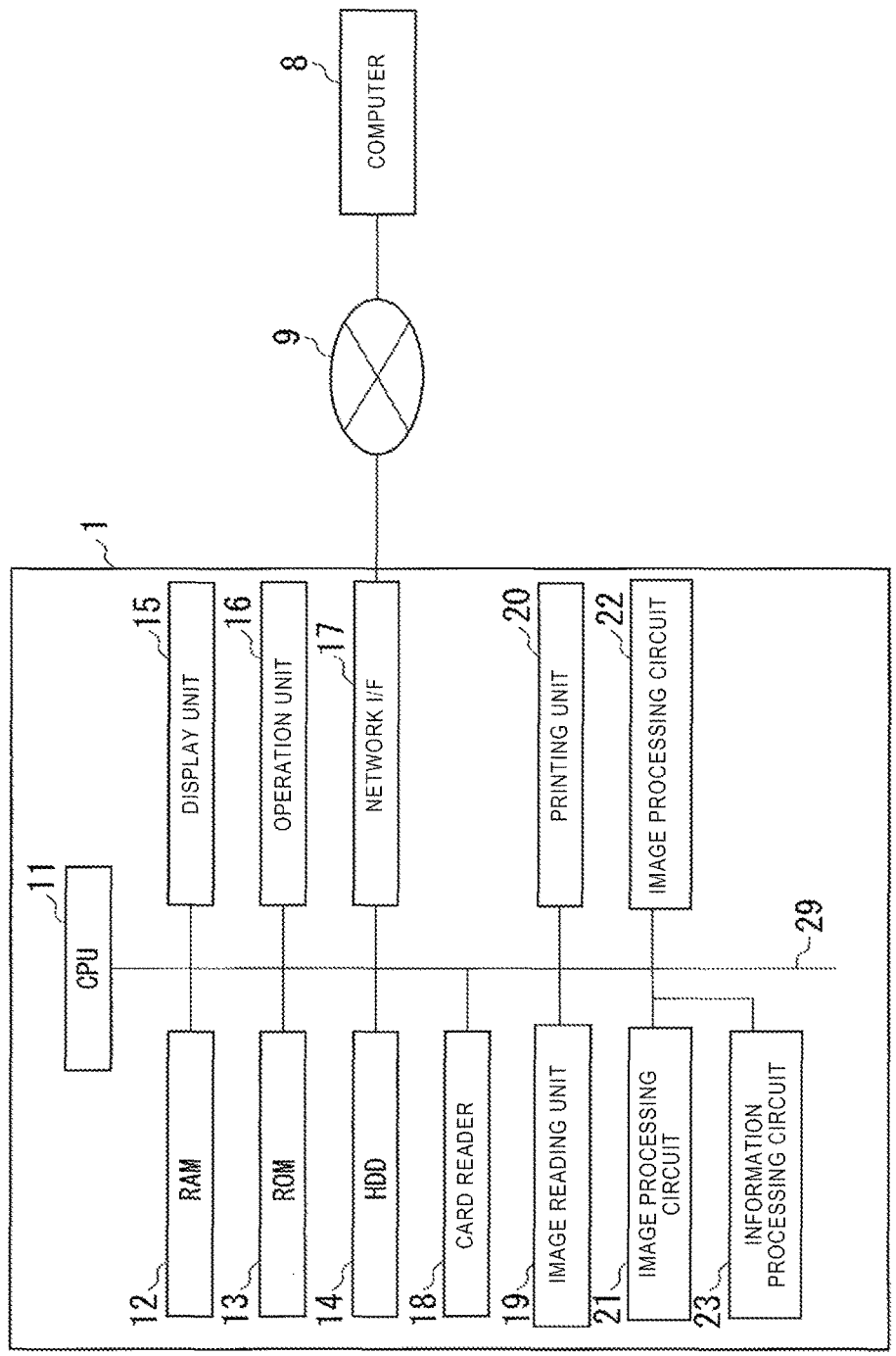
FIG. 1 is a block diagram illustrating a hardware configuration of an information processing apparatus according to an embodiment.

An object of an exemplary embodiment described herein is to provide an information processing apparatus and an image forming apparatus capable of detecting and recording the data amount related to image processing.

In general, according to one embodiment, an information processing apparatus includes a data amount detection unit and a recording unit. The data amount detection unit detects a data amount of data which is related to image processing and is included in transmission information transmitted when performing image processing. The recording unit records the detected data amount.

Hereinafter, an information processing apparatus and an image forming apparatus according to an embodiment will be described with reference to the drawings. In the following description, the same reference numerals are given to the components having the same functions or similar functions. Further, the description of the repeated configuration may be omitted.

First, a block diagram illustrating a hardware configuration of an information processing apparatus according to an embodiment will be described with reference to FIG. 1. FIG. 1 illustrates an image forming apparatus having an image forming function as an embodiment of an information processing apparatus. In the present embodiment, image forming means forming an image with toner or ink on a recording medium such as paper, for example. The image forming may include forming an electrostatic image on a photoconductive body or the like, and forming electronic data of an image on a memory, and the like.

In FIG. 1, an information processing apparatus 1 includes a central processing unit (CPU) 11, a random access memory (RAM) 12, a read only memory (ROM) 13, a hard disk drive (HDD) 14, a display unit 15, an operation unit 16, a network interface (I/F) 17, a card reader 18, an image reading unit 19, a printing unit 20, an image processing circuit 21, an image processing circuit 22, an information processing circuit 23, and a bus 29 for connecting the components.

The CPU 11 controls the information processing apparatus 1 by executing a program stored in the RAM 12, the ROM 13, or the HDD 14. The CPU 11 executes a control program for realizing an operation of the information processing apparatus 1. The control program for realizing the operation of the information processing apparatus 1 may be acquired from, for example, a recording medium in which the control program is recorded, a server via a network, or the like.

The display unit 15 is, for example, a display panel having a display function. The operation unit 16 is, for example, a control panel having an input function. The display unit 15 and the operation unit 16 may be realized by a device such as a touch panel that has a display function and an input function. The network I/F 17 controls communication with a computer 8 which is connected by wired communication or wireless communication via a network 9. The computer 8 transmits, for example, job data to be subjected to image processing, to the information processing apparatus 1. The card reader 18 reads and acquires user information recorded on an IC card.

The image reading unit 19 is a scanner that reads an image of an original document. The image reading unit 19 reads an image on one side or both sides of an original document placed on a flat bed or an original document automatically fed from an auto document feeder (ADF), and generates image data. The printing unit 20 is a printer that forms an image on paper by an electrophotographic system or an ink jet system. The printing unit 20 may be a printer that prints an image with a decolorable recording material.

The image processing circuit 21 and the image processing circuit 22 are circuits for executing image processing. Here, image processing means expansion of an image, compression of an image, rasterization of an image, color space conversion of an image, color correction of an image, correction of distortion of an image, correction of inclination of an image, or the like, for example. In the image processing, for example, when the CPU 11 controls and processes image data stored in the RAM 12, the CPU 11 subsequently reads the image data stored in the RAM 12 and transmits the image data to the image processing circuit 21. Further, the CPU 11 stores image data processed by the image processing circuit 22 in the RAM 12. In FIG. 1, although a case where there are two image processing circuits, which are the image processing circuit 21 and the image processing circuit 22, is illustrated, the number of the image processing circuits in the information processing apparatus 1 is not limited thereto. For example, one image processing circuit may be used, or three or more image processing circuits may be used.

Meanwhile, in some cases, the image data is provided with a portion such as a header portion to which information is added. Thus, user information can be added to the image data. The user information is information for identifying a user of the information processing apparatus 1. The user information is, for example, a user ID, an ID of the computer 8 used by a user, an ID of an organization to which a user belongs, or the like. The CPU 11 can determine that the image data is related to which user's job, by referring to the added user information.

On the other hand, some image processing is executed without the control of the CPU 11. A case where the image data processed by the image processing circuit 21 is subsequently processed by the image processing circuit 22, is considered. The image processing circuit 21 can directly transmit the processed image data to the image processing circuit 22, based on an I/F specification of the bus 29, for example. The image processing circuit 21 can perform high-speed data transmission without requiring a read time or a write time from or to the RAM 12 or the like, by directly transmitting data. When direct data transmission is performed, the CPU 11 cannot refer to the user information recorded in the header of the image data or the like.

The information processing circuit 23 is an aspect of the information processing apparatus according to the present embodiment. The information processing circuit 23 detects an amount of data, by referring to the image data transmitted to the image processing circuit 21 or the image processing circuit 22, or the image data transmitted from the image processing circuit 21 or the like. The image data is an aspect of transmission information which is transmitted. The transmission information transmitted includes at least one of information transmitted to the image processing circuit and information transmitted from the image processing circuit. In the related art, in order to detect an amount of data related to image processing, when processing a job, as described above, it is necessary for the CPU to analyze a job parameter. In the present embodiment, the information processing circuit 23 detects an amount of data based on the transmission information (image data) which is transmitted. Accordingly, even though the CPU does not analyze a job, it is possible to detect the amount of data related to image processing. Details of the information processing circuit 23 will be described later with reference to FIG. 2 or FIG. 3. In FIG. 1, although a case where there is one information processing circuit 23 is illustrated, the number of the information processing circuits 23 in the information processing apparatus 1 is not limited to one. For example, the information processing apparatus 1 may include a plurality of information processing circuits 23.

Acquisition of User Information

The information processing apparatus 1 can acquire the user information from the operation unit 16, the network I/F 17, the card reader 18, or the like. For example, a user of the information processing apparatus 1 can input user information by inputting a password using input keys of the operation unit 16. In addition, a user can transmit a job (for example, a print job) including user information from the computer 8 via the network I/F 17. Further, a user can input user information by causing the card reader 18 to read an IC card. The information processing apparatus 1 can perform use management such as accounting management and user restriction, based on the user information input by a user.

In FIG. 1, although the information processing circuit 23 is illustrated as an aspect of the information processing apparatus according to the present embodiment, the information processing apparatus may be an apparatus including the information processing circuit 23. That is, the information processing apparatus 1 (image forming apparatus) is another aspect of the information processing apparatus according to the present embodiment.

Next, a block diagram illustrating a part of the hardware configuration of the information processing apparatus 1 according to the embodiment will be described with reference to FIG. 2.

Figure 2:
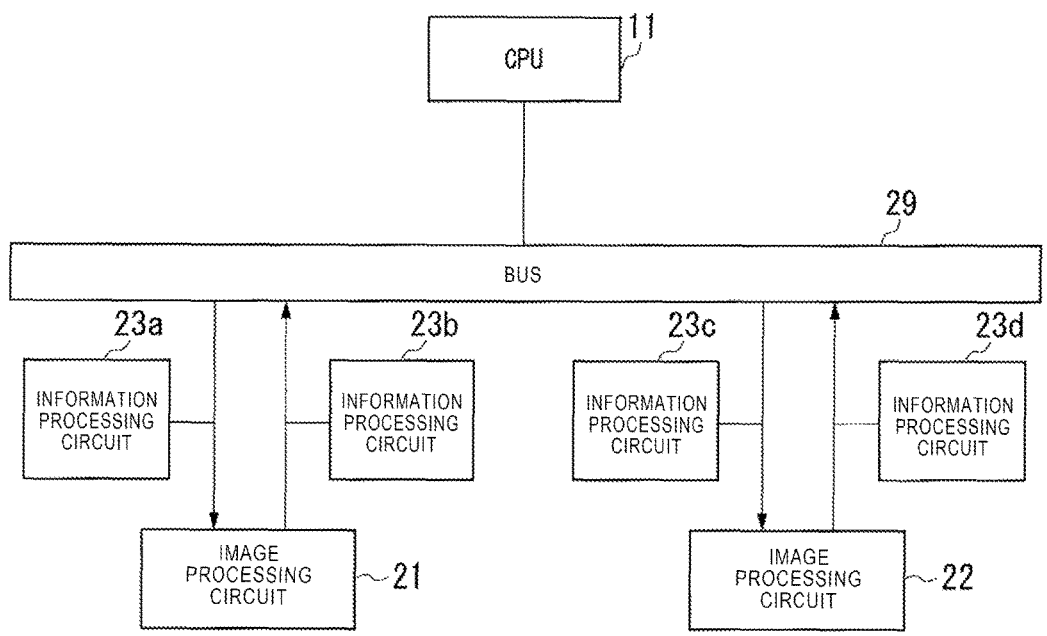
FIG. 2 is a block diagram illustrating a part of the hardware configuration of the information processing apparatus according to the embodiment.

In FIG. 2, the CPU 11, the image processing circuit 21, and the image processing circuit 22 are connected to each other via the bus 29. The information processing circuit 23*a* is connected to the input direction of transmission data of the image processing circuit 21. The information processing circuit 23*b* is connected to the output direction of transmission data of the image processing circuit 21. The information processing circuit 23*c* is connected in the input direction of transmission data of the image processing circuit 22. The information processing circuit 23*d* is connected in the output direction of transmission data of the image processing circuit 22. That is, FIG. 2 illustrates a case where the information processing circuits are connected one by one to the input direction and the output direction of each of the image processing circuits. In the following description, when describing common matters of the information processing circuits 23*a* to 23*d*, the information processing circuits 23*a* to 23*d* are expressed as the "information processing circuits 23" with the common reference numeral. In addition, when describing common matters of the image processing circuit 21 or the image processing circuit 22, the image processing circuit 21 or the image processing circuit 22 is expressed as the "image processing circuit" without a reference numeral.

In image processing by the image processing circuit, the information processing circuits 23 detect a data amount of data which is included in the transmission data and is related to image processing. The information processing circuits 23 detect a data amount of the transmission data transmitted from the bus 29 or a data amount of the transmission data transmitted to the bus 29. The transmission data includes data to be subjected to image processing (for example, image data), and data not to be subjected to image processing (for example, data format, user information, or the like). The information processing circuits 23 can detect the data amount of the data related to image processing, for example, based on the product of a data width and a data length of the transmission data. The data width and the data length are described in the transmission data, for example, based on the I/F specification of the bus 29. The information processing circuits 23 can detect the data width and the data length described based on the I/F specification. When the data width is fixed, the information processing circuits 23 can detect the data amount by detecting the data length. In addition, the information processing circuits 23 may detect the data amount based on the data transmission time (the number of clocks) or the like. The information processing circuits 23 can detect an image processing amount of the image processing circuit by detecting the data amount of the data related to image processing. The detected data amount can be used, for example, for use management such as accounting management according to the image processing amount.

Further, the information processing circuits 23 identify the transmission data transmitted from the bus 29 or the user information which is added to the transmission data transmitted to the bus 29. The information processing circuits 23 can identify the added user information by referring to the header information of the transmission data or the like. The identification of the user information is, for example, to identify the user ID assigned for each user that is represented by a predetermined number of bits. The user ID is identified for recording the data amount of the transmission data. Therefore, the user ID may be different from, for example, the user information acquired by the card reader 18 or the like.

In addition, the information processing circuits 23 record the detected data amount for each of the identified user information. The recording of the data amount for each of the user information is, for example, processing of adding the newly detected data amount to the data amount stored for each of the user information. Further, the recording of the data amount may be processing of subsequently recording information of the detected data amount for each of the user information. The information processing circuits 23 may add information such as a user ID, identification information of a job, or a detection date and time of a data amount, to the data amount to be recorded.

In FIG. 2, a case where, for one image processing circuit, one information processing circuit 23 is respectively disposed in each of the input direction and the output direction of the transmission data is illustrated. However, for one image processing circuit, one information processing circuit 23 may be disposed. For example, in FIG. 2, for the image processing circuit 21, when only the information processing circuit 23*a* is disposed, only the transmission data in the input direction of the image processing circuit 21 is detected. In addition, one information processing circuit 23 may detect the transmission data in both directions of the input direction and the output direction of one image processing circuit. Further, for two image processing circuits, one information processing circuit 23 may be disposed. Even in this case, the information processing circuit 23 may detect the transmission data in any one direction of the input direction and the output direction of the image processing circuit. In addition, the information processing circuit 23 may detect the transmission data in both directions of the input direction and the output direction of the image processing circuit.

The information processing circuits 23 can directly detect (without control of the CPU 11) the data amount of the transmission data transmitted to the bus 29, and record the detected data amount. Therefore, the CPU 11 does not need to perform processing such as detection of the data amount of the transmission data, and thus a processing load is reduced. In addition, a circuit including the information processing circuits 23 and the image processing circuit can be integrated as a large-scale integration (LSI) system. When the information processing circuits 23 and the image processing circuit are integrated as a LSI, it is possible to reduce an additional cost of the information processing circuits 23.

Figure 3:
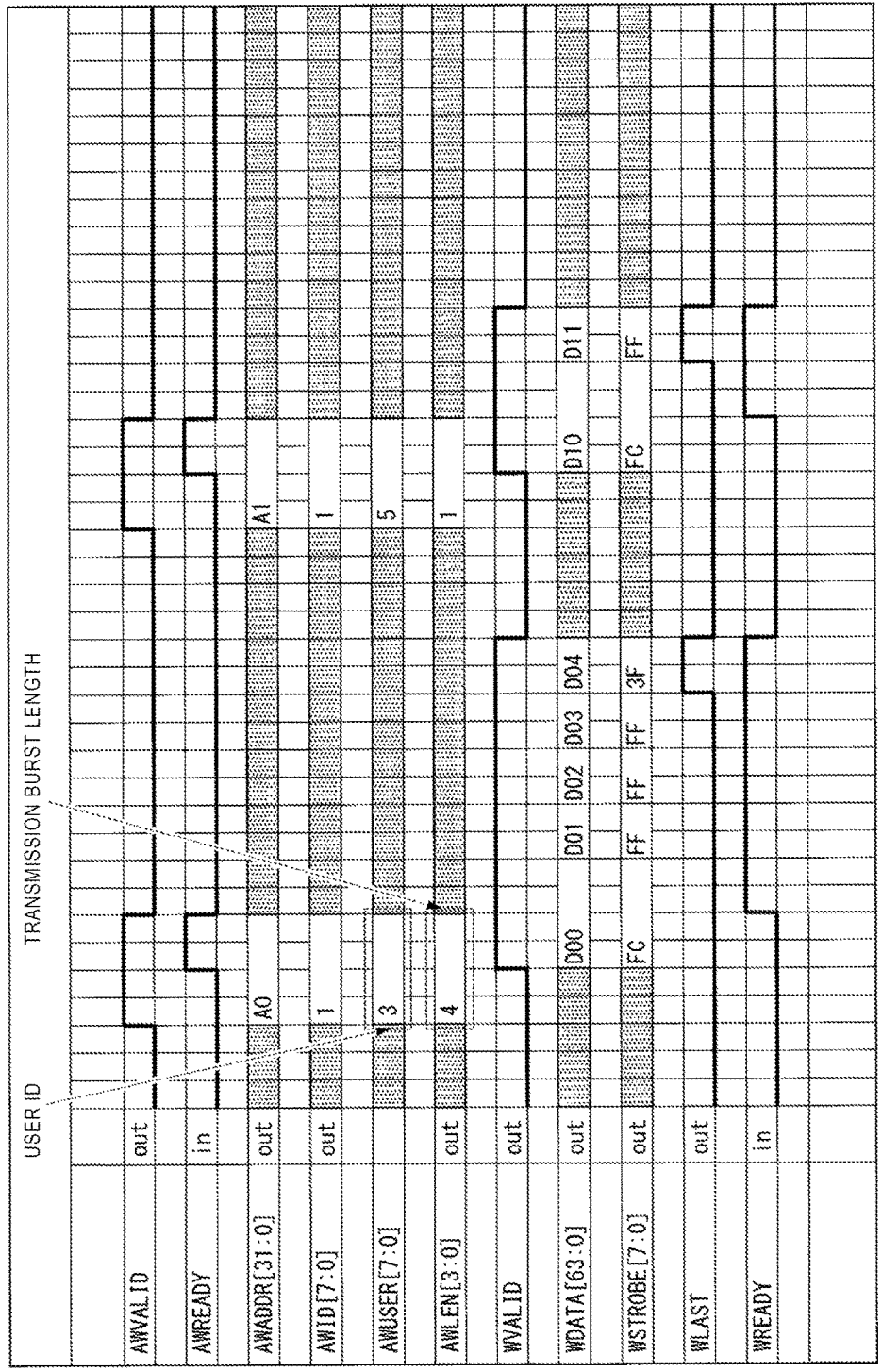
FIG. 3 is a timing chart illustrating a data configuration of transmission data according to the embodiment.

Next, a timing chart illustrating a data configuration of the transmission data according to the embodiment will be described with reference to FIG. 3. FIG. 3 illustrates a case where an AXI bus is used as the bus 29. The AXI is an interface protocol which is based on a specification defined by Advanced Microcontroller Bus Architecture (AMBA) (registered trademark).

The AXI enables data transmission between a master device and a slave device in a memory map manner. In the AXI bus, a data width of the interface differs depending on the specification (version) as a base. The data width of the AXI bus is, for example, 32, 64, 128, 256, 512 or 1024 bits. The AXI bus is configured to include signals of channels such as an address channel, a read data channel, a write data channel, and a write response channel. The AXI bus can independently transmit data in each channel. Therefore, it is possible to respectively and independently perform input of the transmission data to the image processing circuit and output of the transmission data from the image processing circuit. The AXI bus performs data transmission by using each of signal lines of a DATA line, a VALID line, and a READY line. VALID is a signal indicating that a transmission side which transmits the transmission data presents valid data as DATA. READY is a signal indicating that a receiving side can receive DATA. That is, data transmission is established when both of the VALID signal and the READY signal rise at the same time.

FIG. 3 illustrates a write operation in the AXI bus. The AXI bus includes signals such as AWVALID, AWREADY, AWADDR, AWID, AWUSER, AWLEN, WVALID, WDATA, WSTROBE, WLAST, WREADY, and the like. The AWxxx represents a signal which is used for a write operation in an address channel. The Wxxx represents a signal which is used for a write operation in a data channel. FIG. 3 illustrates data transmission in which an address is transmitted on an address channel and data is transmitted on a data channel.

In FIG. 3, when the AWVALID signal and the AWREADY signal rise at the same time, an address and data are transmitted. A user ID is added to the AWUSER signal. The addition of the user ID to the AWUSER signal is performed by the CPU 11 illustrated in FIG. 1. The CPU 11 adds the user ID to the AWUSER signal of the data transmitted in image processing, based on the user information acquired from the card reader 18 or the like. In the AXI bus, it is possible to easily acquire information added to signals of each channel. That is, the information processing circuits 23 can easily acquire the user ID by referring to the AWUSER signal of the transmission data. The user ID may be one based on the acquired user information. For example, when the user information is the name of a user, the user ID may be a number assigned to each user. In addition, the user information and the user ID may be the same value.

In addition, the AWLEN signal includes information of transmission burst length designated when transmitting data. The burst length is the number of times of data transmission in burst transmission. The burst length varies depending on a burst type. The burst type is defined by memory addressing when transmitting data. The burst type includes an increment type for increment of an address, a wrapping type for return to a head address when an address reaches the end of a memory, or a fixed type for transmission with a fixed address during burst transmission. In the case of the increment type, a burst length of one to sixteen times can be designated. In the case of the wrapping type, a burst length of any one of 2, 4, 8 or 16 times can be designated.

Further, the WDATA signal includes information of the data width described above. The data amount can be detected by multiplying the burst length included in the AWLEN signal and the data width included in the WDATA signal. That is, the information processing circuit 23 can directly acquire the information on the user ID and the data amount by referring to the signal of the transmission data of the AXI bus. The AXI bus illustrated in FIG. 3 is an example of the bus 29, and a bus based on another specification may be used.

Figure 4:
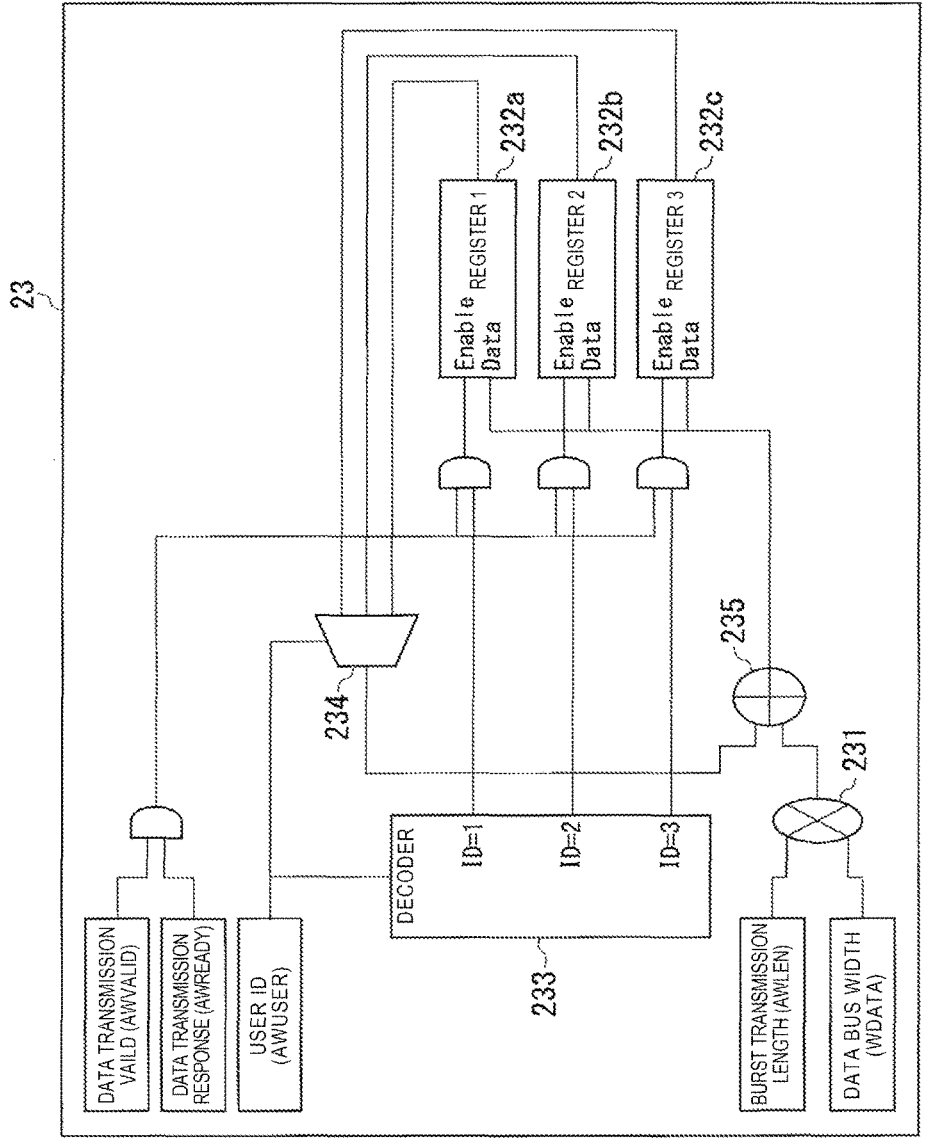
FIG. 4 is a block diagram illustrating a hardware configuration of an information processing circuit according to the embodiment.

Next, a block diagram illustrating a hardware configuration of the information processing circuit 23 according to the embodiment will be described with reference to FIG. 4. FIG. 4 illustrates a case where the information processing circuit 23, which is an aspect of the information processing apparatus according to the present embodiment, is realized by hardware.

In FIG. 4, the information processing circuit 23 is connected to signal lines of AWVALID, AWREADY, AWUSER, AWLEN, and WDATA, and directly acquires data of the signal lines. The information processing circuit 23 includes a multiplier 231, a register 232a, a register 232b, a register 232c, a decoder 233, a multiplexer 234, and an adder 235. The registers 232a to 232c record the data amount for each user ID. FIG. 4 illustrates a case where three registers of the registers 232a to 232c correspond to three user IDs of ID=1 to 3. That is, the register 232a is for a user with ID=1, the register 232b is for a user with ID=2, and the register 232c is for a user with ID=3.

The rise of both of the AWVALID signal and the AWREADY signal indicates that the address and data are valid as described above. In the information processing circuit 23, an AND result of the AWVALID signal and the AWREADY signal is input to the registers 232a to 232c via AND circuits, which are at pre-stages of Enable terminals of the registers 232a to 232c. Accordingly, the AND result of the AWVALID signal and the AWREADY signal is set as a data acquisition timing for the registers 232a to 232c.

The AWUSER signal includes the user ID. The user ID is input to the decoder 233, and thus the decoder 233 rises an output signal of any one of ID=1, ID=2, and ID=3. The output signal of any one of ID=1, ID=2, and ID=3 is input to any one of the AND circuits, which are at pre-stages of the Enable terminals of the registers 232a to 232c. The AND circuits at the pre-stages of the Enable terminals enable any one of the registers 232a to 232c at the data acquisition timing.

In addition, the user ID is input to the multiplexer 234, and thus the multiplexer 234 selects and outputs any one of the output signals of the registers 232a to 232c. The multiplexer 234 outputs an output value to the adder 235. That is, the multiplexer 234 outputs the output value corresponding to the user ID to the adder 235.

The multiplier 231 detects the data amount by multiplying the burst transmission length included in the AWLEN signal and the data bus width included in the WDATA signal. In the present embodiment, the burst transmission length and the data bus width included in the transmission data are detected, and thus, even in a simple circuit such as the multiplier 231, detection of the data amount (multiplication) can be made. The multiplier 231 outputs the multiplied data amount to the adder 235. The adder 235 adds the output of the multiplexer 234 and the output of the multiplier 231, and inputs the result to Data terminals of the registers 232a to 232c. Any one of the registers 232a to 232c, which is enabled by the user ID, stores and records the data amount added by the adder 235. The data amount for each user ID that is recorded in the registers 232a to 232c can be read. For example, the CPU 11 illustrated in FIG. 1 can read the data amount for each user ID that is recorded in the registers 232a to 232c, by using data transmission by the AXI bus. The recorded data amount for each user ID may be transmitted to a memory or the like by hardware (not illustrated).

In FIG. 4, although the case where the information processing circuit 23, which is an aspect of the information processing apparatus according to the present embodiment, is realized by hardware is illustrated, a part of the functions of the information processing circuit 23 may be realized by a programmable device or software.

Figure 5:
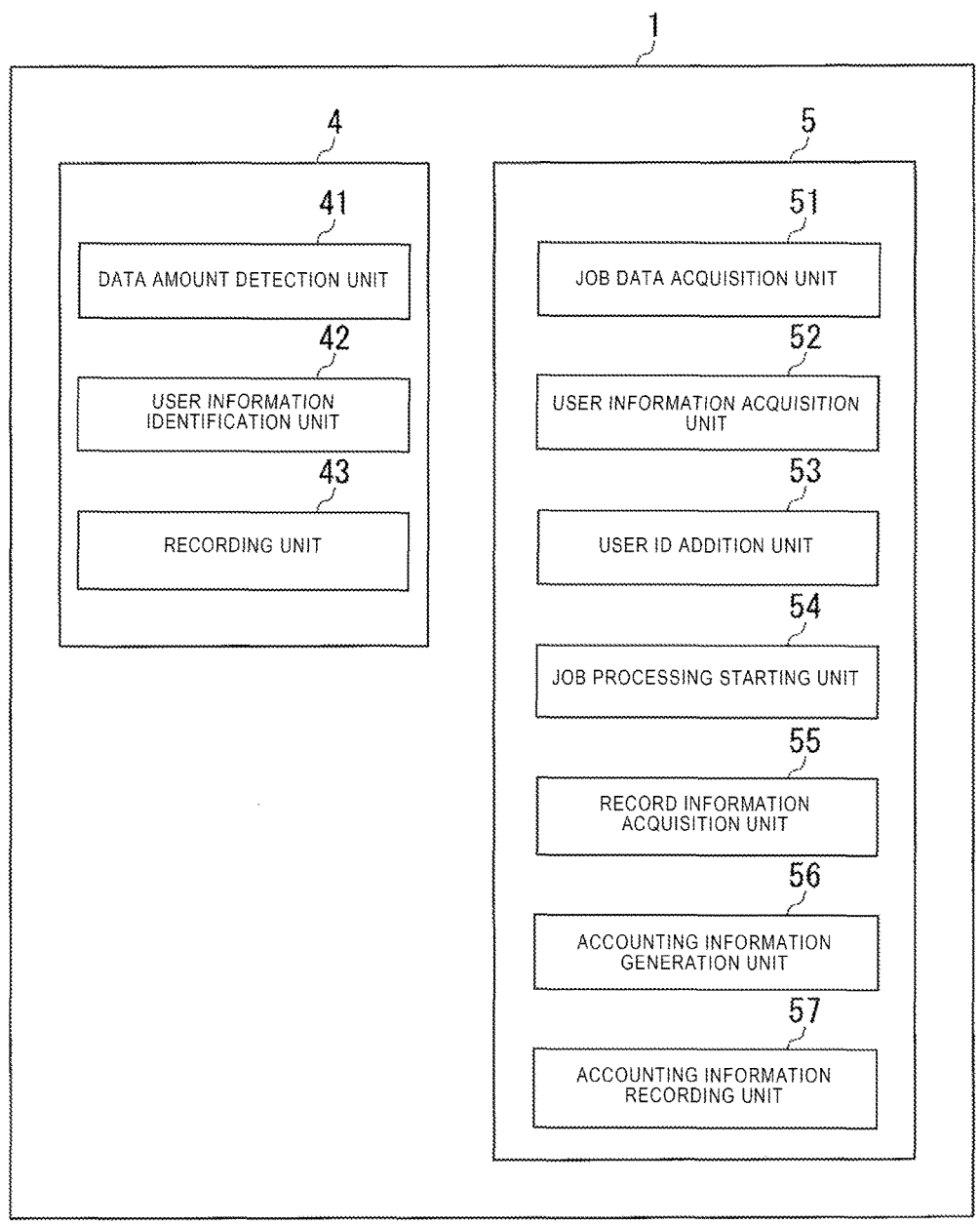
FIG. 5 is a block diagram illustrating a software configuration of the information processing apparatus according to the embodiment.

Next, a block diagram illustrating a software configuration of the information processing apparatus 1 according to the embodiment will be described with reference to FIG. 5. FIG. 5 illustrates a case where the information processing apparatus 1 according to the embodiment is realized by software.

In FIG. 5, the information processing apparatus 1 has functions of a first information processing unit 4 and a second information processing unit 5. The first information processing unit 4 has functions of a data amount detection unit 41, a user information identification unit 42, and a recording unit 43. The second information processing unit 5 has functions of a job data acquisition unit 51, a user information acquisition unit 52, a user ID addition unit 53, a job processing starting unit 54, a record information acquisition unit 55, an accounting information generation unit 56, and an accounting information recording unit 57. In FIG. 5, these functions can be realized, for example, by software executed by the CPU 11 illustrated in FIG. 1.

The data amount detection unit 41 has the same function as that of the multiplier 231. That is, the data amount detection unit 41 detects the data amount based on the burst transmission length included in the AWLEN signal and the data bus width included in the WDATA signal. The data amount detection unit 41 detects the data amount, for example, by multiplying the burst transmission length and the data bus width. In addition, when the data bus width is fixed, the data amount detection unit 41 may detect the data amount based on the burst transmission length.

The user information identification unit 42 identifies the user information included in the transmission data. For example, the user information identification unit 42 identifies the user ID added to the AWUSER signal of the AXI bus. In addition, the recording unit 43 records the data amount detected by the data amount detection unit 41, for each user information identified by the user information identification unit 42.

That is, the data amount detection unit 41, the user information identification unit 42, and the recording unit 43 in the first information processing unit 4 are obtained by realizing the functions of the information processing circuit 23 using software.

The job data acquisition unit 51 acquires job data including user information that is related to image processing. The job related to image processing is a job including data to be processed in the image processing circuit. The job acquired by the job data acquisition unit 51 is a job which is executed in the information processing apparatus 1. The job which is executed in the information processing apparatus 1 is a print job, a copy job, a FAX job, a scan job, or the like. For example, the job data of a print job is generated when the information processing apparatus 1 acquires print data transmitted from the computer 8 illustrated in FIG. 1. The job data of a copy job is generated when an original document placed on the image reading unit 19 is read by a user's operation using the operation unit 16. It is assumed that the job data includes, for example, the user information acquired from the card reader 18 or the like. The job data acquisition unit 51 acquires job data including the user information, and provides the acquired job data to the user information acquisition unit 52.

The user information acquisition unit 52 acquires user information corresponding to the job data. A method of acquiring the user information may differ depending on the job. For example, in a printer job, user information is added to print data by a printer driver. Therefore, the user information acquisition unit 52 acquires user information included in printer data from a printer application of the information processing apparatus 1, for example. In addition, in some cases, a copy job or a scan job is executed after user authentication is performed by the card reader 18 or the like. When a job is executed after user authentication, the user information acquisition unit 52 acquires user information corresponding to the job from an authentication function section (for example, authentication application) of the information processing apparatus 1. In a copy job or the like which is executed without user authentication, the user information acquisition unit 52 cannot acquire user information. When the user information cannot be acquired, the user information acquisition unit 52 may acquire specific information such as "guest" indicating that the user information cannot be acquired, instead of the user information.

The user ID addition unit 53 adds the user ID to the transmission data transmitted when performing image processing. The user ID is generated in correspondence with the user information acquired by the user information acquisition unit 52. For example, when the user ID is added to predetermined bits of the AWUSER signal of the AXI bus, the user ID needs to be expressed within a predetermined number of bits. The user ID addition unit 53 converts the user information into a user ID with predetermined bits, and adds the user ID to the AWUSER signal. The user ID addition unit 53 may have a function of an application such as a printer application or a copy application that executes a job.

The job processing starting unit 54 starts job processing by transmitting the transmission data to which the user ID is added to the image processing circuit. The job processing starting unit 54 may also have a function of an application that executes a job. Further, the job processing starting unit 54 may instruct an application or the like that executes a job to transmit the transmission data to which the user ID is added.

The record information acquisition unit 55 acquires the data amount for each recorded user ID. The record information acquisition unit 55 acquires the data amount, for example, for each user ID recorded in the recording unit 43. Further, the record information acquisition unit 55 may acquire the data amount for each user ID, by acquiring the output of the registers 232*a* to 232*c* illustrated in FIG. 4 from the data channel of the AXI bus.

The accounting information generation unit 56 generates accounting information based on the data amount for each user ID that is acquired from the record information acquisition unit 55. The accounting information is, for example, use fee for each user ID. The accounting information may be generated by a unit price for a predetermined data amount. In addition, the accounting information may be generated for each department associated with a plurality of user IDs. The accounting information generation unit 56 records the generated accounting information in the accounting information recording unit 57. The accounting information recorded in the accounting information recording unit 57 may be displayed on the display unit 15 or be printed by the printing unit 20, for example, according to the operation of the operation unit 16. The accounting information can be used for accounting management.

In FIG. 5, although the case of performing accounting management as the use management based on the data amount is illustrated, the use management based on the data amount is not limited thereto. For example, when the data amount reaches a predetermined amount or more, the information processing apparatus may perform use restriction that decreases the processing speed of image processing or prohibits the use of image processing.

In FIG. 5, the case where each function of the data amount detection unit 41, the user information identification unit 42, and the recording unit 43 in the information processing apparatus 1 is realized by software is described. In addition, the case where each function of the job data acquisition unit 51, the user information acquisition unit 52, the user ID addition unit 53, the job processing starting unit 54, the accounting information generation unit 56, and the accounting information recording unit 57 is realized by software is described. However, one or more functions of the information processing apparatus 1 may be realized by hardware. In addition, each of the functions of the information processing apparatus 1 may be implemented by dividing one function into a plurality of functions. Further, each of the functions of the information processing apparatus 1 may be implemented by integrating two or more functions into one function. Furthermore, the information processing apparatus 1 may be a device realized by one casing, or may be a system realized by a plurality of devices connected via a network or the like. For example, the information processing apparatus 1 may be configured with an apparatus such as a server apparatus, a laptop PC, a tablet PC, a PDA, or a smartphone, and a peripheral apparatus such as a printer. In addition, one or more functions of the functions of the information processing apparatus 1 may be realized by another apparatus. In other words, the information processing apparatus 1 does not need to have all the functions, and may have some functions.

Further, in FIG. 5, the case where the first information processing unit 4 and the second information processing unit are realized by software is described. However, the information processing apparatus 1 may be realized, for example, by combining the information processing circuit 23 and the second information processing unit 5.

Next, a flowchart illustrating user ID addition processing of the information processing apparatus 1 according to the embodiment will be described with reference to FIG. 6.

Figure 6:
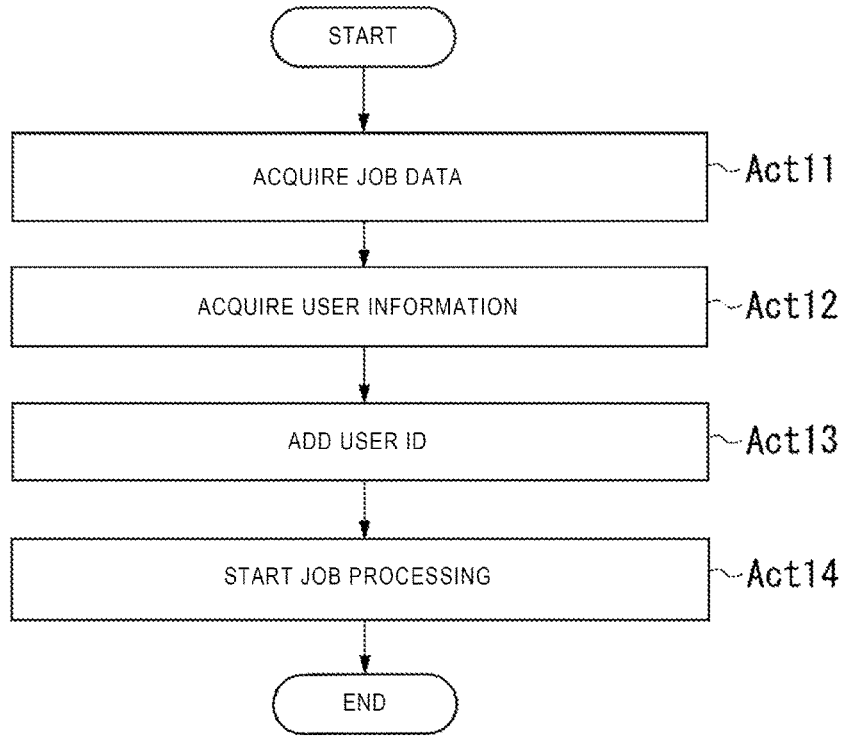
FIG. 6 is a flowchart illustrating user ID addition processing of the information processing apparatus according to the embodiment.

In FIG. 6, the information processing apparatus 1 acquires job data (Act 11). The acquisition of the job data is executed, for example, by the job data acquisition unit 51. After executing the processing of Act 11, the information processing apparatus 1 acquires user information corresponding to the job data acquired in Act 11 (Act 12). The acquisition of the user information is executed, for example, by the user information acquisition unit 52. After executing the processing of Act 12, the information processing apparatus 1 adds a user ID based on the user information acquired in Act 12 to the transmission data transmitted when performing image processing (Act 13). The addition of the user ID is executed, for example, by the user ID addition unit 53. After executing the processing of Act 13, the information processing apparatus 1 starts job processing (Act 14). The starting of the job processing is executed by the job processing starting unit 54. After executing the processing of Act 14, the information processing apparatus 1 ends processing illustrated in the flowchart.

Next, a flowchart illustrating accounting information generation processing of the information processing apparatus according to the embodiment will be described with reference to FIG. 7.

Figure 7:
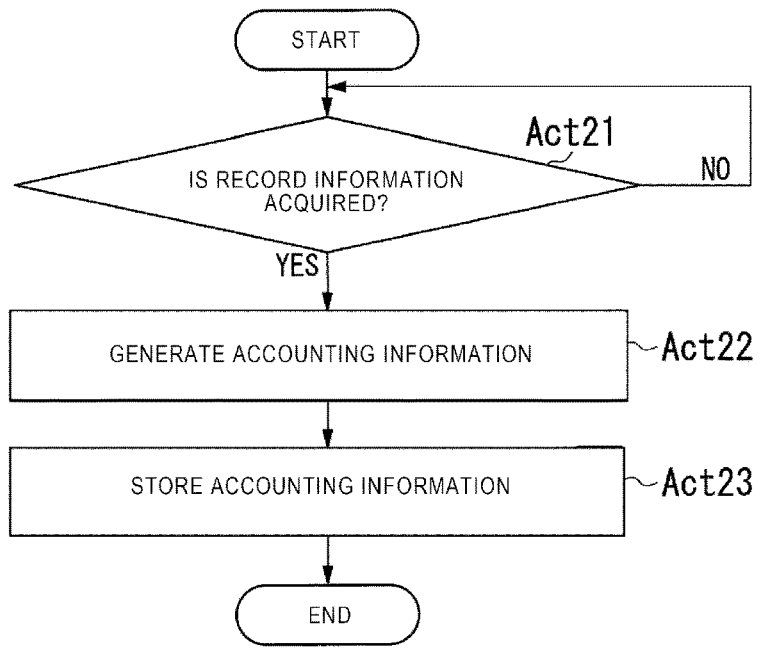
FIG. 7 is a flowchart illustrating accounting information generation processing of the information processing apparatus according to the embodiment.

In FIG. 7, the information processing apparatus 1 determines whether or not record information is acquired (Act 21). The record information is the data amount for each recorded user ID. The determination of acquisition of the record information is executed, for example, by the record information acquisition unit 55. When it is determined that the record information is not acquired (NO in Act 21), the information processing apparatus 1 repeats processing of Act 21 and waits for acquisition of the record information.

On the other hand, when it is determined that the record information is acquired (YES in Act 21), the information processing apparatus 1 generates accounting information based on the data amount for each user ID that is acquired in Act 21 (Act 22). The generation of the accounting information is executed, for example, by the accounting information generation unit 56. After executing the processing of Act 22, the information processing apparatus 1 stores the accounting information generated in Act 22. For example, the accounting information generation unit 56 writes the accounting information in the HDD 14 illustrated in FIG. 1, and thus the accounting information is stored. After executing the processing of Act 23, the information processing apparatus 1 ends processing illustrated in the flowchart.

The above-described information processing apparatus according to the present embodiment includes a data amount detection unit that detects a data amount of data which is related to image processing and is included in the transmission information transmitted when performing image processing, and a recording unit that records the detected data amount. According to this configuration, the information processing apparatus can detect and record the data amount related to image processing.

In addition, the information processing apparatus according to the present embodiment further includes a user information identification unit that identifies user information included in the transmission information, and the recording unit records the data amount for each of the identified user information. According to this configuration, the information processing apparatus can perform use management such as accounting management when using the information processing apparatus, for each user, according to the data amount after image processing.

Further, in the information processing apparatus according to the present embodiment, the data amount detection unit detects the data amount based on the bus width and the data length of data, which are defined by a bus standard for transmitting transmission information. According to this configuration, the information processing apparatus can easily detect the data amount.

In addition, in the information processing apparatus according to the present embodiment, the user information identification unit identifies user information included in the transmission information on a predetermined channel defined by a standard. According to this configuration, the information processing apparatus can easily identify the user information.

Further, the image forming apparatus according to the present embodiment includes a user information addition unit, a data amount detection unit, a user information identification unit, a recording unit, an accounting information generation unit, and an image forming unit. The user information addition unit adds user information to transmission information transmitted when performing image processing. The data amount detection unit detects a data amount of data which is related to image processing and is included in the transmission information. The user information identification unit identifies user information included in the transmission information. The recording unit records the detected data amount for each of the identified user information. The accounting information generation unit generates accounting information based on the recorded data amount for each user information. The image forming unit forms an image based on the data. According to this configuration, the image forming apparatus can detect and record the data amount related to image processing. Further, it is possible to perform use management such as accounting management when using the image forming apparatus for each user, by detecting and recording the data amount.

According to at least one embodiment described above, the information processing apparatus according to the embodiment includes a data amount detection unit and a recording unit. According to this configuration, it is possible to detect and record the data amount related to image processing.

In addition, the above-described various processing according to the present embodiment may be performed by executing a program for realizing the functions of the apparatus described in the present embodiment. The program to be executed may be recorded on a computer readable recording medium, and the program recorded on the recording medium may be read into a computer system. The "computer system" referred to herein may be one including hardware such as an OS and peripheral devices. In addition, when a WWW system is used, the "computer system" may be one including a website providing environment (or display environment). Further, the "computer-readable recording medium" is, for example, a writable nonvolatile memory such as a flexible disk, a magneto-optical disk, a ROM, a flash memory, or the like. The computer readable recording medium may be a portable medium such as a CD-ROM, or a storage device such as a hard disk built in the computer system.

Furthermore, the "computer readable recording medium" includes those holding a program for a certain period of time. The computer-readable recording medium is, for example, a volatile memory inside a computer system serving as a server or a client when a program is transmitted via a communication line. The communication line is, for example, a network such as the Internet, a telephone line, or the like. The volatile memory is, for example, a dynamic RAM (DRAM). In addition, the program may be transmitted from a computer system in which the program is stored in a storage device or the like to another computer system. The transmission of the program is performed, for example, via a transmission medium or by a transmission wave in a transmission medium. Here, the "transmission medium" that transmits the program refers to a medium having a function of transmitting information. The transmission medium is, for example, a network (communication network) such as the Internet or a communication line (communication line) such as a telephone line. Further, the program may be one for realizing a part of the above-described functions. Furthermore, the program may be a so-called difference file (differential program) which realizes the above-described functions in combination with a program recorded in advance in the computer system.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory to store instructions; and
a processor, coupled to the memory, that facilitates execution of the instructions to perform operations, comprising:
detecting a defined amount of data which is related to image processing based on transmission information transmitted when performing image processing, wherein the transmission information comprises a bus signal representative of a transmission burst length value, and wherein the transmission burst length value is determined based on a value associated with a number of times the transmission information is transmitted during the image processing; and
recording the detected defined amount of data.

2. The apparatus according to claim 1, wherein the operations further comprise:
identifying user information included in the transmission information,
wherein the recording comprises recording the defined amount of data for each of the identified user information.

3. The apparatus according to claim 1,
wherein the operations further comprise detecting the defined amount of data based on a bus width and a data length of the data, which are defined by a bus standard for transmitting the transmission information.

4. The apparatus according to claim 3,
wherein the operations further comprise identifying user information included in the transmission information based on a predetermined channel defined by the bus standard.

5. An image forming apparatus comprising:
a memory to store instructions; and
a processor, coupled to the memory, that facilitates execution of the instructions to perform operations, comprising:
adding user information to transmission information transmitted when performing image processing;
detecting a defined amount of data which is related to image processing based on the transmission information, wherein the transmission information comprises a bus signal representative of a transmission burst length value, and wherein the transmission burst length value is determined based on a value associated with a number of times the transmission information is transmitted during the image processing;
identifying user information included in the transmission information;
recording the defined amount of data for each of the identified user information;
generating accounting information based on the defined amount of data for each of the user information; and
forming an image based on the defined amount of data.

6. The apparatus according to claim 5,
wherein the detecting comprises detecting the defined amount of data based on a bus width and a data length of the data, which are defined by a bus standard for transmitting the transmission information.

7. The apparatus according to claim 6,
wherein the operations further comprise identifying user information included in the transmission information based on a predetermined channel defined by the bus standard.

8. An information processing method comprising:
performing, by a device comprising a processor, image processing;
detecting, by the device, a defined amount of data which is related to image processing based on transmission information transmitted, wherein the transmission information comprises a bus signal representing a transmission burst length, and wherein the transmission burst length is determined based on a value associated with a number of times the transmission information is transmitted when performing the image processing; and
recording, by the device, the defined amount of data.

9. The method according to claim 8, further comprising:
identifying, by the device, user information included in the transmission information,
recording, by the device, the defined amount of data for each of the identified user information.

10. The method according to claim 8, further comprising:
detecting, by the device, the defined amount of data based on a bus width and a data length of the data, which are defined by a bus standard for transmitting the transmission information.

11. The apparatus according to claim 10, further comprising:
identifying, by the device, user information included in the transmission information on a predetermined channel defined by the bus standard.

* * * * *